(12) United States Patent
Mittelbach et al.

(10) Patent No.: US 11,813,966 B2
(45) Date of Patent: Nov. 14, 2023

(54) LINEAR DRIVE, LONGITUDINAL ADJUSTMENT UNIT OF A SEAT, AND MOTOR VEHICLE

(71) Applicant: IMS GEAR SE & CO. KGAA, Donaueschingen (DE)

(72) Inventors: Marcel Mittelbach, Schluchsee (DE); Robin Teichmann, Constance (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 231 days.

(21) Appl. No.: 17/615,793

(22) PCT Filed: Jun. 4, 2020

(86) PCT No.: PCT/EP2020/065453
§ 371 (c)(1),
(2) Date: Dec. 1, 2021

(87) PCT Pub. No.: WO2020/245255
PCT Pub. Date: Dec. 10, 2020

(65) Prior Publication Data
US 2022/0250511 A1 Aug. 11, 2022

(30) Foreign Application Priority Data
Jun. 4, 2019 (EP) .................................... 19178264

(51) Int. Cl.
*F16H 19/04* (2006.01)
*B60N 2/06* (2006.01)
(Continued)

(52) U.S. Cl.
CPC ............. *B60N 2/067* (2013.01); *F16H 19/04* (2013.01); *F16H 25/12* (2013.01); *F16H 31/007* (2013.01); *F16H 37/124* (2013.01); *F16H 55/08* (2013.01)

(58) Field of Classification Search
CPC ........ F16H 19/043; F16H 25/08; F16H 19/04; F16H 25/12; F16H 37/124; F16H 31/007; F16H 25/02; B60N 2/067
See application file for complete search history.

(56) References Cited

U.S. PATENT DOCUMENTS 5,148,067 A * 9/1992 LaSota .................... H02K 7/065
310/80
5,187,994 A * 2/1993 Hirai ........................ F16H 25/02
74/120

(Continued)

FOREIGN PATENT DOCUMENTS

CN 108473072 A * 8/2018 ........... B60N 2/0705
CN 108473072 A 8/2018
(Continued)

OTHER PUBLICATIONS

Office action issued Feb. 10, 2023, in parallel pending CN application No. 202080040521.3.
(Continued)

*Primary Examiner* — Randell J Krug
(74) *Attorney, Agent, or Firm* — Nath, Goldberg & Meyer; Jerald L. Meyer

(57) ABSTRACT

The present invention relates to a linear drive (1), comprising a camshaft (10) having at least one camshaft disk (15) which is arranged in a longitudinal axis (X), at least one rack (30) comprising at least one tooth (31), and at least one propulsion element (20) having at least one propulsion tooth (21), wherein the at least one propulsion element (20) has a recess (25) with which the camshaft (10) engages, wherein the camshaft (10) is coupled to the at least one propulsion element (20) by means of the at least one camshaft disk (15), and wherein the propulsion element (20) can be pushed into and out of the rack (30) in order to generate a propulsion in the longitudinal axis (X) when the camshaft (10) rotates. In
(Continued)

addition, the present invention relates to a longitudinal adjustment unit for a seat and to a motor vehicle having at least one longitudinal adjustment unit.

23 Claims, 4 Drawing Sheets

(51) Int. Cl.
*F16H 37/12* (2006.01)
*F16H 31/00* (2006.01)
*F16H 25/12* (2006.01)
*F16H 55/08* (2006.01)

(56) References Cited

U.S. PATENT DOCUMENTS

| | | | | |
|---|---|---|---|---|
| 5,280,999 | A * | 1/1994 | Jones | B60N 2/2352 |
| | | | | 297/354.12 |
| 5,477,741 | A * | 12/1995 | Takenaka | F16H 25/02 |
| | | | | 310/156.08 |
| 5,582,068 | A * | 12/1996 | Fukui | F16H 25/02 |
| | | | | 29/564 |
| 5,626,055 | A * | 5/1997 | Fukui | F16H 19/043 |
| | | | | 477/9 |
| 5,806,369 | A * | 9/1998 | Takenaka | F16H 25/08 |
| | | | | 74/116 |
| 5,823,050 | A * | 10/1998 | Takenaka | F16H 25/08 |
| | | | | 74/116 |
| 9,726,152 | B2 * | 8/2017 | Nohara | F03D 15/00 |
| 11,679,693 | B2 * | 6/2023 | Werschler | F16H 25/18 |
| | | | | 297/344.1 |
| 2002/0174734 | A1 * | 11/2002 | Chinery | F04B 1/146 |
| | | | | 74/60 |
| 2013/0000431 | A1 * | 1/2013 | Schreiber | F16H 25/12 |
| | | | | 74/89.23 |
| 2023/0049563 | A1 * | 2/2023 | Mittelbach | F16H 19/04 |

FOREIGN PATENT DOCUMENTS

| | | | | |
|---|---|---|---|---|
| DE | 19932046 A1 * | 1/2001 | | B60N 2/0232 |
| DE | 19932046 A1 | 1/2001 | | |
| EP | 0612935 A1 | 8/1994 | | |
| EP | 0612935 A1 * | 8/1994 | | F16H 19/04 |
| EP | 2541098 A1 | 1/2013 | | |
| EP | 2541098 A1 * | 1/2013 | | F16H 19/04 |
| EP | 2944276 A1 * | 11/2015 | | A61B 17/0469 |
| EP | 2944276 A1 | 11/2015 | | |
| EP | 3748195 A1 * | 12/2020 | | B60N 2/067 |
| GB | 1088288 A | 10/1967 | | |
| KR | 20180092283 A * | 8/2018 | | |
| WO | WO-2005032878 A1 * | 4/2005 | | B60N 2/0232 |
| WO | WO-2008028540 A1 * | 3/2008 | | F16H 25/06 |
| WO | 2018108762 A1 | 6/2018 | | |
| WO | WO-2018108762 A1 * | 6/2018 | | B60N 2/005 |

OTHER PUBLICATIONS

EP Search Report dated Dec. 3, 2019, in corresponding application EP 19178264.8.

Parallel pending Chinese patent application No. 202080040521.3 notice of grant has been dated May 31, 2023.

* cited by examiner

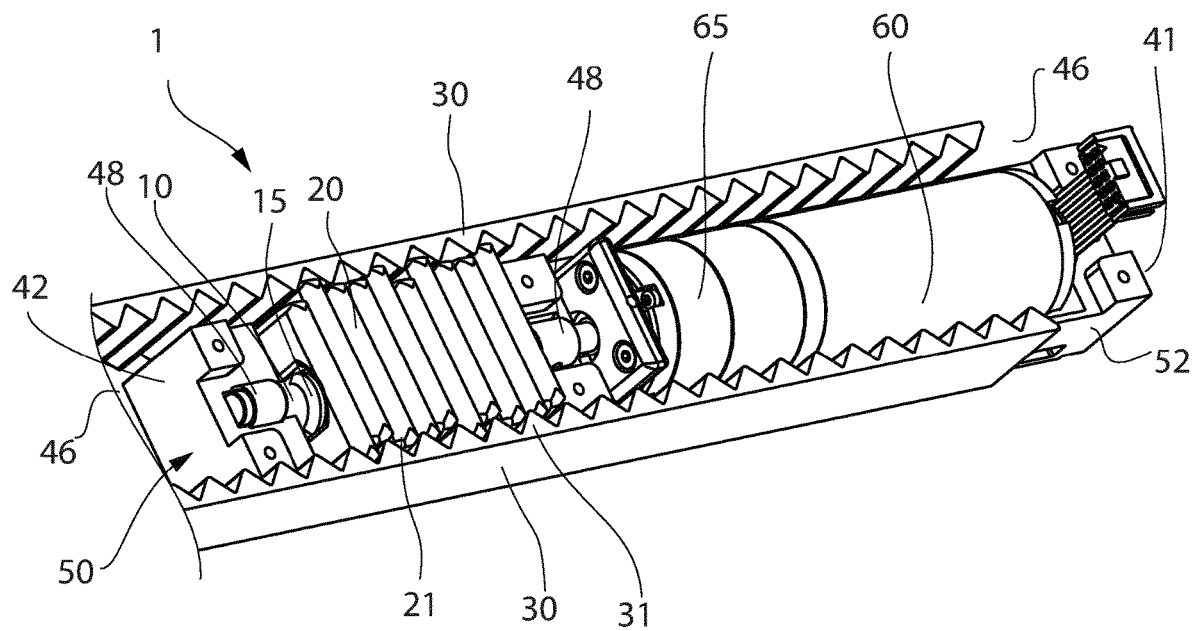
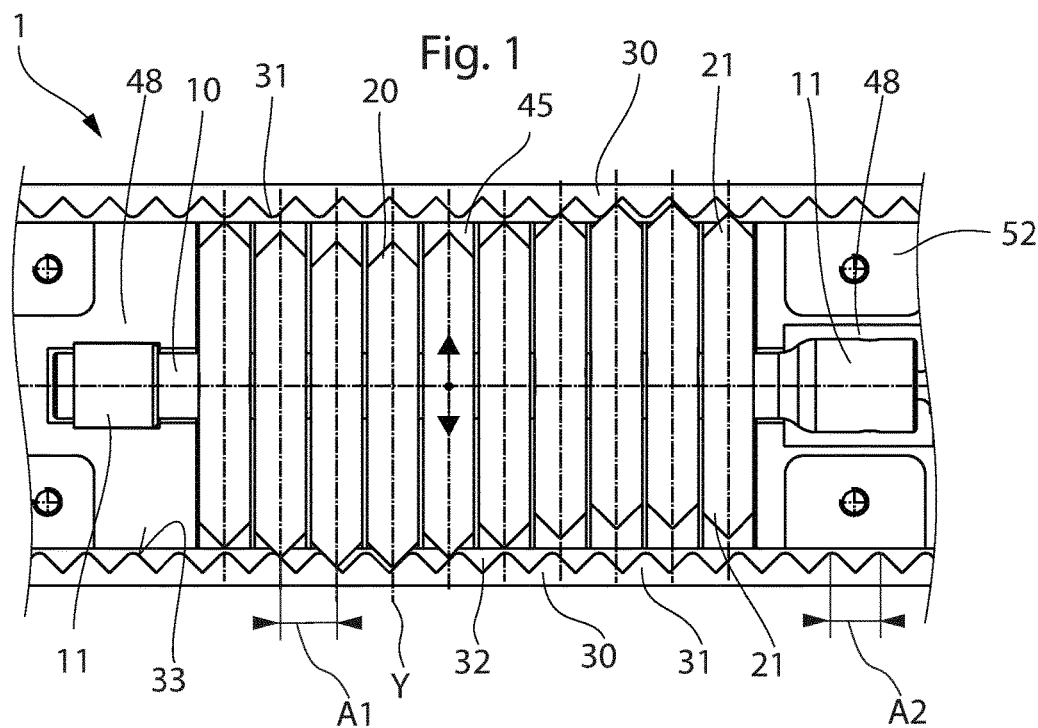
Fig. 1
Fig. 2

LINEAR DRIVE, LONGITUDINAL ADJUSTMENT UNIT OF A SEAT, AND MOTOR VEHICLE

This is a National Phase Application filed under 35 U.S.C. 371 as a national stage of PCT/EP2020/065453, filed Jun. 4, 2020, an application claiming the benefit of European Application No. 19178264.8 filed Jun. 4, 2019, the content of each of which is hereby incorporated by reference in its entirety.

The present invention relates to a linear drive having the features of claim 1, to a longitudinal adjustment unit for a seat having the features of claim 21, and to a motor vehicle having the features of claim 22.

Linear drives are known from the prior the art in various designs and are commonly used as longitudinal adjustment units for adjusting the position of a seat in motor vehicles. Longitudinal adjustment units typically interact with a lower rail fixed on a chassis and an upper rail arranged within said lower rail, it being possible to drive the upper rail by the longitudinal adjustment unit in a motorized manner and said rail being coupled to the seat. The adjustment of the upper rail by means of the longitudinal adjustment unit is typically carried out in the prior art by means of a spindle which is arranged within the upper rail and is supported in each case at its first end and second end.

Longitudinal adjustment units of this type are known, for example, from DE 36 40 197 A1, DE 42 08 948 C2, DE 196 42 655 C2, DE 198 15 283 A1, DE 10 2004 013 009 A1 and DE 10 2006 052 936 A1.

Due to the high requirements for a linear drive which, in addition to the adjustment function as a longitudinal adjustment unit, must also ensure accident safety, such linear drives have different types of design requiring different production methods and processes. It has been shown that a play-free linear movement can be realized only with great effort and that breaking loads can be adapted only with great effort. In addition to accident safety, new types of interior concepts for motor vehicles also require longer movement distances and higher movement speeds. Increasing the movement speed of linear drives that have proven successful in the past by using a spindle is only possible to a limited extent.

This is where the present invention begins.

The object of the invention is to propose an improved linear drive which eliminates in an expedient manner the disadvantages known from the prior art. Furthermore, a linear drive with a particularly compact design is to be specified, which enables an almost play-free linear movement at the same time as a variable and adaptable breaking load. In addition, it is intended to be possible to realize a high adjustment speed using the linear drive according to the invention.

These objects are achieved by a linear drive having the features of claim 1, a longitudinal adjustment unit having the features of claim 21, and a motor vehicle having the features of claim 22.

Further advantageous embodiments of the invention are specified in the dependent claims.

The linear drive according to the invention having the features of claim 1 comprises a camshaft which is arranged in a longitudinal axis. The longitudinal axis simultaneously forms the axis of rotation of the camshaft, specifies a direction of greatest extension and the movement direction of the linear drive, and forms an approximate axis of symmetry of the linear drive. In addition, the linear drive according to the invention comprises at least one rack comprising at least one tooth and comprises at least one propulsion element having at least one propulsion tooth, wherein the at least one propulsion element has a recess with which the camshaft can engage. Furthermore, according to the invention, the camshaft is coupled to the at least one propulsion element in the recess by means of a camshaft disk, and the propulsion element can be pushed into and out of the rack in order to generate a propulsion in the longitudinal axis when the camshaft rotates.

According to the invention, the at least one propulsion element is coupled to the camshaft via the recess in such a way that, when the camshaft rotates, the at least one propulsion element is pushed at least once completely into the rack and also pushed out, as a result of which a corresponding propulsion is generated on the at least one tooth of the rack when the propulsion tooth of the propulsion element slides off. As a result of the at least one propulsion element also being pushed out due to the coupling to the camshaft, preferably no further means are necessary in order to release a form fit when the propulsion element is pressed in. In other words, when the camshaft rotates continuously, the at least one propulsion tooth follows a continuously repeating (cyclical) movement and is thereby positively driven by the camshaft.

According to a preferred embodiment of the present invention, the recess pierces the propulsion element. Accordingly, the recess extends completely through the propulsion element, it being possible for the recess to be either a clearance hole, a through hole, or an outwardly open groove. The recess preferably forms two side surfaces which are designed to establish a sliding contact with one of the at least one camshaft disk. The two side surfaces are preferably arranged on two diametrical sides. The at least one propulsion tooth can be arranged—preferably in parallel and spaced apart—on an outer side facing away from the two side surfaces.

According to a further preferred embodiment of the present invention, the camshaft penetrates the at least one propulsion element in the recess. In other words, the camshaft is inserted in the longitudinal axis through the recess, the propulsion element preferably being oriented transversely to the longitudinal axis. It is advantageous if the camshaft contacts at least with one of the side surfaces of the recess and forms a drive coupling between the camshaft and the at least one propulsion element.

According to a development of the present invention, the camshaft comprises at least two camshaft disks which are arranged in parallel and spaced apart in the longitudinal axis. A propulsion element is assigned to each camshaft disk, with a deflection of each propulsion element depending on the angular position of the relevant camshaft disk.

According to a development of the present invention, it has proven to be advantageous if the at least two camshaft disks are arranged at an angular offset by an angle $\alpha$ about the longitudinal axis. The angular offset is preferably $0 < \alpha < 360$, and in one development the angular offset between two adjacent camshaft disks is $\alpha = 144°$. The deflection of each propulsion element during a rotation of the camshaft is thus phase-shifted. Here and in the following, a phase shift is understood to mean an entering and exiting of the at least two propulsion elements into or out of the rack at different angles of rotation of the camshaft.

According to a further advantageous embodiment of the present invention, the camshaft disk is designed to be asymmetrical about the longitudinal axis, the camshaft disk also preferably being designed to be mirror-symmetrical about a plane in the longitudinal axis.

In addition, it has proven to be particularly advantageous if the at least one camshaft disk is designed in such a way that the at least one propulsion element is pushed into and out of the rack at a constant angular velocity about the longitudinal axis substantially at a constant speed when the camshaft rotates. In this context, a substantially constant speed of the at least one propulsion element is understood to mean an approximately constant speed between the two turning points at which the at least one propulsion element is either pushed into the rack or pushed out of the rack. Between the two turning points, preferably more than 80%, preferably more than 90%, of the stroke, the speed should be within a tolerance of ±10%, more preferably ±5%, around an average value. At the turning points, the propulsion element is decelerated accordingly and then accelerated again. Such a movement can be described in an X-Y diagram as a zigzag, the stroke being resolved in the X-axis and the revolution angle being resolved in the Y-axis.

Furthermore, it has proven to be advantageous if, according to a development of the present invention, a friction surface of the camshaft disk is formed at a distance from the longitudinal axis in the direction of rotation and in that a change in the distance in at least one first portion increases approximately linearly in a direction of rotation and decreases linearly in the direction of rotation in at least one second portion. The friction surface thus extends approximately in a spiral shape, the friction surface being designed in such a way that the distance between two diametrical sides is approximately constant or corresponds approximately to a width of the recess of the relevant propulsion element. In this embodiment, the camshaft disk is in the shape of a heart, the center of the area moving when it rotates about the longitudinal axis within a plane which lies in the longitudinal axis.

It has also proven to be advantageous if the at least one first portion and the at least one second portion are connected by at least one rounded transition. In particular, it is preferred if, in the transition, the distance between the two diametrical sides of the friction surface is slightly smaller than the width of the recess, as a result of which jamming or tilting of the camshaft disk in the recess is prevented. In particular, it is preferred if the transitions are designed as a transition radius, the transition radius corresponding approximately to the width of the recess, preferably with a tolerance of ±10%.

In a development of the present invention, the first portion and/or the second portion can extend over a semicircle. By means of such an embodiment of the camshaft disk, the propulsion element is pushed into and out of the rack completely once when the camshaft rotates fully about the longitudinal axis, this movement consequently corresponding to a cycle.

According to a further preferred embodiment of the present invention, a width of the recess is selected in such a way that the camshaft disk is encompassed approximately without play. In this case, the recess of the at least one contact element can be lined with appropriate means, through which the camshaft disk can contact the recess with reduced friction or can slide off the side surfaces. For example, the friction between the camshaft disk or the friction surface of the camshaft disk and the side surfaces of the recess can be reduced by selecting appropriate material pairings, it also being possible to use lubricants to reduce the friction.

Furthermore, it has proven to be advantageous if a height of the recess corresponds at least to the width of the recess. In particular, it is preferred if the height is greater than the width of the recess, as a result of which the at least one transverse surface connecting the side surfaces does not come into contact with the camshaft disk.

According to a development of the present invention, the at least two racks can be arranged at an offset from one another. The offset describes a distance, measured in parallel with the longitudinal axis, between the tooth tips of the at least two teeth of the racks. If the offset is $\Delta A=0$, the at least two racks are arranged mirror-symmetrically or line-symmetrically with respect to the longitudinal axis, while, in the case of an offset greater than zero, i.e., $\Delta A>0$, the at least two racks are arranged asymmetrically with respect to the longitudinal axis. In a preferred embodiment, the offset can be half a distance, a quarter, or a third of the distance between two teeth of the respective rack bars, where the distance between two teeth of the at least two racks should preferably be of the same size.

According to a further advantageous embodiment of the present invention, at least two propulsion teeth are provided. The at least two propulsion teeth are arranged in such a way that they are pushed in and out in a phase-shifted manner when the camshaft rotates. According to a preferred embodiment, the at least two propulsion teeth can be arranged on opposite sides of each propulsion element or on opposite sides of the recess in each propulsion element and/or in a common row, it preferably being possible for the at least two propulsion teeth to be arranged in alignment on two outer sides of the propulsion element, i.e. in a common plane transverse to the longitudinal axis. The at least two propulsion teeth can also be arranged offset on a common side of the propulsion element or be offset on opposite sides. The at least two propulsion teeth of the at least one propulsion element are each pushed into and out of a rack in a phase-shifted manner, the phase shift preferably being 180° or in radii II.

According to an advantageous embodiment of the present invention, the at least two propulsion teeth are arranged in a common row at a first distance in the longitudinal axis and the teeth of the rack are arranged in a common row at a second distance along the longitudinal axis, the first distance being smaller than the second distance or the second distance being smaller than the first distance. In other words, the first distances between the propulsion teeth and the second distances between the teeth of the at least one rack should be different.

The first distance and the second distance are each based on the geometric center of each propulsion tooth or of each tooth of the rack and are measured in parallel with the longitudinal axis. By virtue of dimensioning the first distance and the second distance differently, the respective propulsion teeth are positioned in different relative positions to the teeth of the rack during a cyclical movement of the at least two propulsion teeth with a phase shift.

According to a further preferred embodiment of the present invention, the at least one propulsion tooth of the propulsion element has a greater, equal, or smaller tooth depth and/or a greater tooth depth than the at least one tooth of the rack. By increasing the tooth depth and the tooth length of the teeth of the rack, the contact surface of the propulsion teeth on the tooth flanks or the friction surface on the tooth flanks is increased, as a result of which a more uniform transmission of force can be achieved between the rack and the propulsion teeth. It is also possible for the tooth depth and the tooth length of the propulsion teeth to be greater than the tooth depth and the tooth length of the teeth of the rack, as a result of which a greater overlap can be produced and higher maximum loads can be achieved and thus the smooth running of the linear drive can be improved. Accordingly, by selecting the size ratios between the propulsion teeth and the teeth of the rack, maximum loads and different running characteristics can be set. If the tooth length and the tooth depth of the propulsion teeth are smaller than the tooth length and the tooth depth of the teeth of the rack, more than one propulsion tooth can enter or exit a tooth space between two teeth of the rack at the same time.

Furthermore, it has proven to be advantageous if the at least two propulsion teeth and the teeth of the rack have a corresponding tooth shape. A corresponding tooth shape is to be understood to mean that, upon fully entering the tooth space between two teeth of the rack, each propulsion tooth, together with its friction surface facing the teeth of the rack, can lie flat against at least one of the friction surfaces of the teeth of the rack. In particular, it has proven to be advantageous if each propulsion tooth and each at least one tooth of the rack have an equal tooth flank angle. In this connection, it is noted that the friction surface of the respective tooth flanks does not necessarily have to correspond to a plane, but can also be designed as a curved surface—preferably curved outwardly.

According to a further preferred embodiment of the present invention, the at least one propulsion tooth is designed to be crowned or arrow-shaped. The crowned or arrow-shaped propulsion tooth has a tooth tip which, unlike conventional propulsion teeth, is formed not along a straight line but along a V- or C-shaped line, preferably a symmetrical or C-shaped line. Due to the crowned or arrow-shaped embodiment of the at least one propulsion tooth, said tooth is not simultaneously pushed into the tooth space of the rack over the entire width of said tooth. Rather, starting from the tip, the propulsion tooth is brought into effective contact with the rack, as a result of which a noise reduction can be achieved in comparison with a straight tooth flank.

According to a development of the linear drive, a drive is provided. The drive is preferably an electric motor by means of which the camshaft can be driven.

Furthermore, it is advantageous if a transmission is arranged between the drive and the camshaft, it being possible for a planetary gearset to be arranged particularly preferably between the drive and the camshaft.

The drive, the transmission and/or the camshaft can be arranged in the carriage according to an embodiment of the linear drive. The drive in the carriage can be supplied with energy and/or with control signals via a drag chain with corresponding electrical lines.

Furthermore, it has proven to be advantageous if the carriage holds the at least one propulsion element so as to be movably supported in a plane which lies on the longitudinal axis. In particular, it is preferred if the carriage has appropriate means which hold the at least one propulsion element mounted in a friction-reducing manner.

A further aspect of the present invention relates to a longitudinal adjustment unit comprising a linear drive as described above.

Another and final aspect of the present invention relates to a motor vehicle comprising at least one longitudinal adjustment unit having at least one linear drive according to the invention.

An exemplary embodiment according to the invention as well as developments of the present invention are described in detail below with reference to the accompanying drawings. In the drawings:

FIG. 1 shows a perspective representation of a linear drive according to the invention, comprising a carriage arranged in a rack housing having at least one propulsion element which is drivingly coupled to a camshaft via a camshaft disk and, when the camshaft rotates, is pushed into and out of at least one rack of the rack housing in a cyclical stroke movement to generate a propulsion;

FIG. 2 shows a top view of the linear drive according to the invention according to FIG. 1;

FIG. 4a shows a simplified side view of the camshaft having ten propulsion elements;

FIG. 4b shows a sectional representation in the section line A-A according to FIG. 4a;

FIG. 4c shows a sectional representation in the section line B-B according to FIG. 4a;

Identical or functionally identical components are identified below with the same reference symbols. For the sake of clarity, not all parts that are identical or functionally identical in the individual Figures are provided with a reference number.

Figure 3:
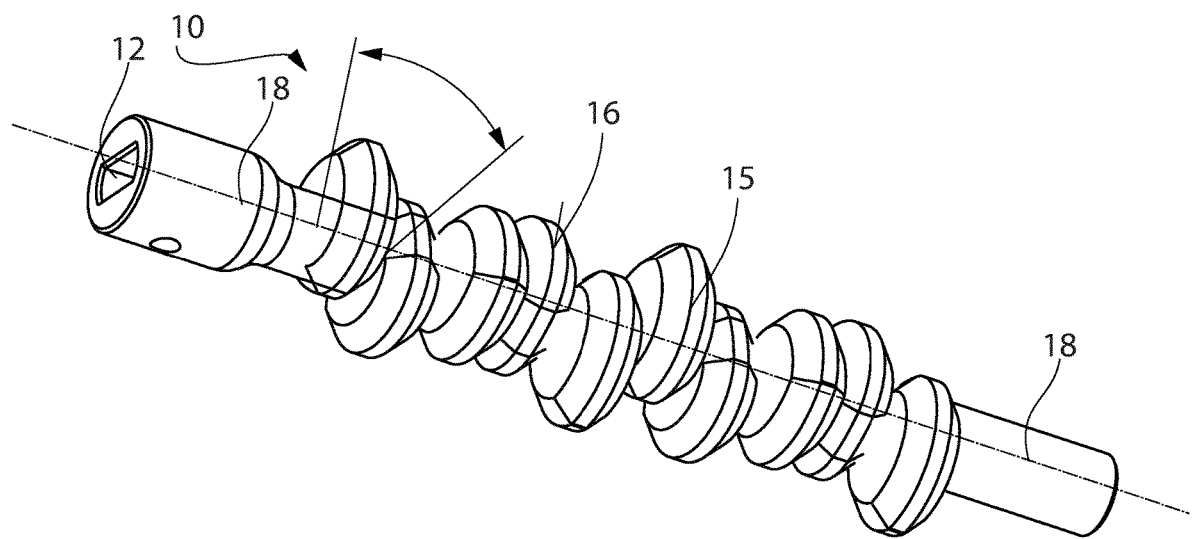
FIG. 3 shows a perspective and detailed representation of the camshaft according to FIG. 1.

FIG. 1 shows a linear drive 1 according to the invention comprising a rack housing 40 and a carriage 50 which is held so as to be movably mounted along a longitudinal axis X between two racks 30 which are opposite one another in a transverse axis Y. The linear drive 1 can be used in a longitudinal adjustment unit (not shown) for adjusting a seat (not shown) in a motor vehicle (not shown).

As in the illustrated exemplary embodiment, the rack housing 40 can be designed in the shape of a cuboid and enclose—at least partially—a space 46. One of the racks 30 is arranged on each of two opposite sides facing the space 46, each rack being formed from a large number of teeth 31 arranged preferably equidistantly along the longitudinal axis X. A corresponding tooth space 32 is formed between every two teeth 31.

The rack housing 40 can be designed in such a way that it forms a stop in the longitudinal axis X in a first end region and in a second end region, by means of which stop the maximum movement distance of the carriage 50 within the space 46 is predetermined.

Figure 7:
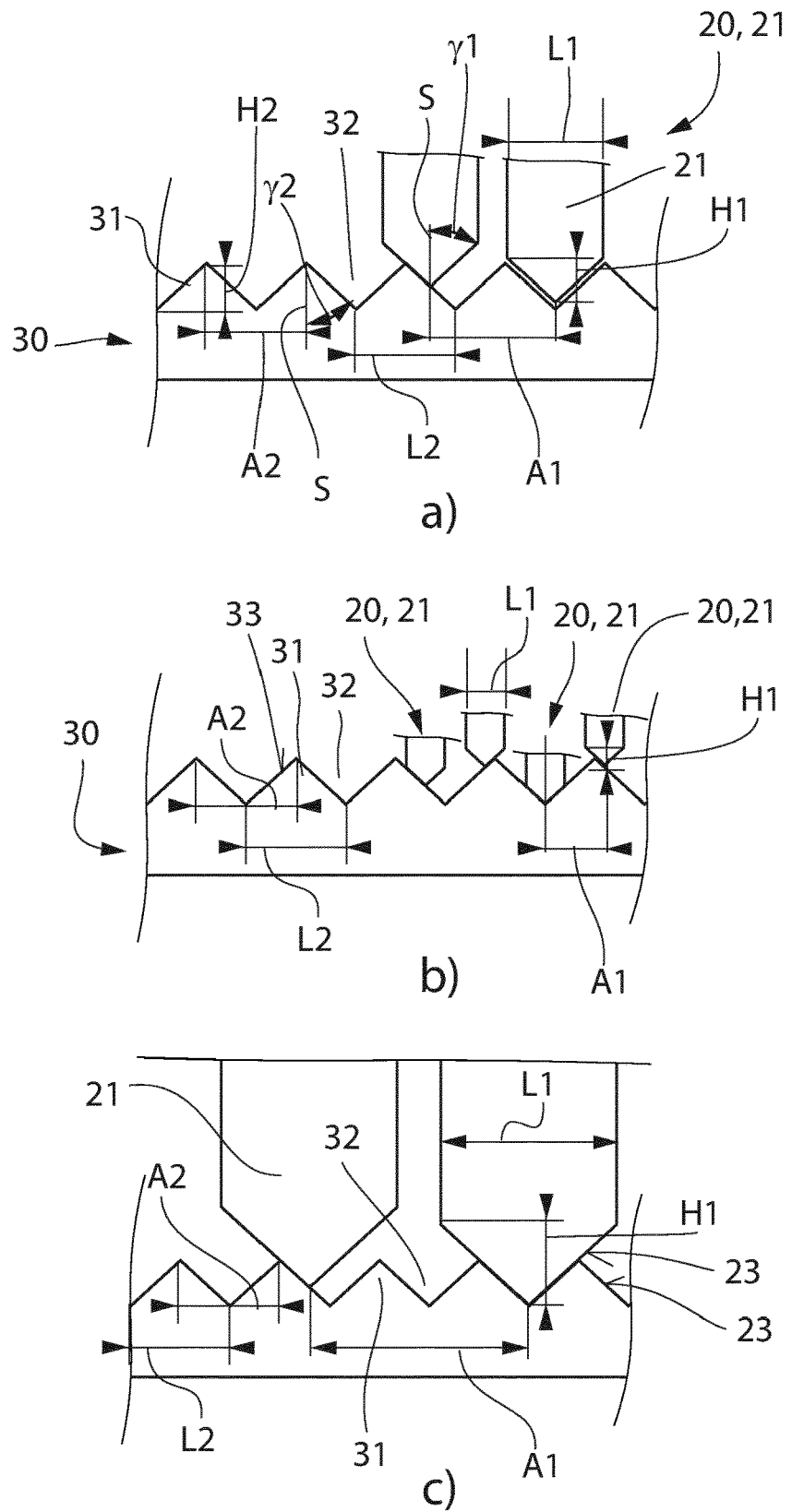
FIG. 7a-7c show schematic representations of different size ratios of the teeth of the rack and the propulsion teeth.

In the illustrated exemplary embodiment—in particular as shown in detail in FIGS. 7a-7c—the teeth 31 of the two racks 30 are of identical design, but the teeth 31 of the racks 30 can have different tooth depths H2, tooth widths L2, and/or tooth flank angles $\gamma 2$, where the two flanks of each tooth 31 of a rack preferably have the same tooth flank angle $\gamma 2$.

The arrangement of the teeth 31 of the racks 30 on the two opposite sides of the longitudinal axis X is symmetrical, that is, the respective teeth 31 are arranged mirror-symmetrically with respect to the longitudinal axis X. However, the teeth 31 of the two racks 30 can also be arranged asymmetrically about the longitudinal axis X, it being possible for the teeth 31 of the two racks 30 to have an offset $\Delta A$. For example, the offset $\Delta A$ according to a development (not shown) can be approx. ½ A2, i.e., $\Delta A \approx$ ½ A2. The offset $\Delta A$ can be selected as large as desired.

The teeth 31 are arranged at a distance A2, the distance A2 being measured in each case based on the geometric center or a tooth tip of the relevant tooth 31. In the case of symmetrical teeth 31, a tooth tip is typically formed in the geometric center, from which two symmetrical tooth flanks extend as friction surfaces 33. In the exemplary embodiment illustrated, the two flanks enclose an angle of approximately 135°, where the flank angles should be $30 \leq \gamma 2 \leq 180$.

The carriage 50 can be formed from a multi-part housing and have a first housing part 53 and a second housing part 54 (not shown). The housing comprises a first end region 41 and a second end region 42 which can interact with the rack housing 40 as an end stop.

FIG. 2 shows that a camshaft 10 is arranged in the housing of the carriage 50 coaxially with respect to the longitudinal axis X, which carriage is held so as to be rotatably mounted in the longitudinal axis X on bearing portions 11 by means of bearings 48. The camshaft 10 can be coupled to a drive 60 via a connecting portion 12 and by means of a transmission 65, as a result of which the drive 60 can cause the camshaft 10 to rotate about the longitudinal axis X. The longitudinal axis X is thus also the axis of rotation of the camshaft 10. The connecting portion 12 serves as a force coupling with the drive 60 and can be configured for this purpose to form a form-fitting plug connection.

The drive 60 can preferably be an electric drive and can also preferably be coupled to the camshaft 10 by means of the transmission 65, which is designed as a planetary gearset. The transmission 65 can step up or step down a rotational speed of the drive 60 to a rotational speed of the camshaft.

The camshaft 10—according to FIG. 3—has a plurality of camshaft disks 15 which are arranged at a distance from one another between the two bearings 48. The camshaft disks 15 are each arranged in a plane orthogonal to the longitudinal axis X and can—as will be described in detail below—have a specific asymmetrical shape or design.

As can be seen in particular from FIG. 3, the camshaft disks 15 are arranged in a rotated manner along the longitudinal axis X, in each case at an angle α with respect to one another, and, in the present exemplary embodiment, the heart-shaped camshaft disks 15 are arranged so as to be rotated about the longitudinal axis X by the angle α=22.5° in each case. The angle α is measured in a plane perpendicular to the longitudinal axis X.

The camshaft 10 can be formed from a large number of camshaft disks 15 and a drive shaft 13, it being possible for the camshaft disks 15 to each have an opening 14 that receives the drive shaft 13. Each camshaft disk 15 can be rotationally rigidly connected to the drive shaft 13 in any desired way, for example by means of a press-fit assembly.

Further in relation to FIG. 2, it can be seen that a plurality of guide recesses 45 are each arranged in the housing and arranged transversely to the longitudinal axis X in each case in the center and on opposite sides to the camshaft disks 15.

A propulsion element 20 is inserted into the relevant guide recess 45, can be moved in the guide recess 45, and—as indicated by the double arrow—can perform a stroke movement which extends radially or as a secant with respect to the longitudinal axis X or in parallel with the transverse axis Y.

Figure 4:
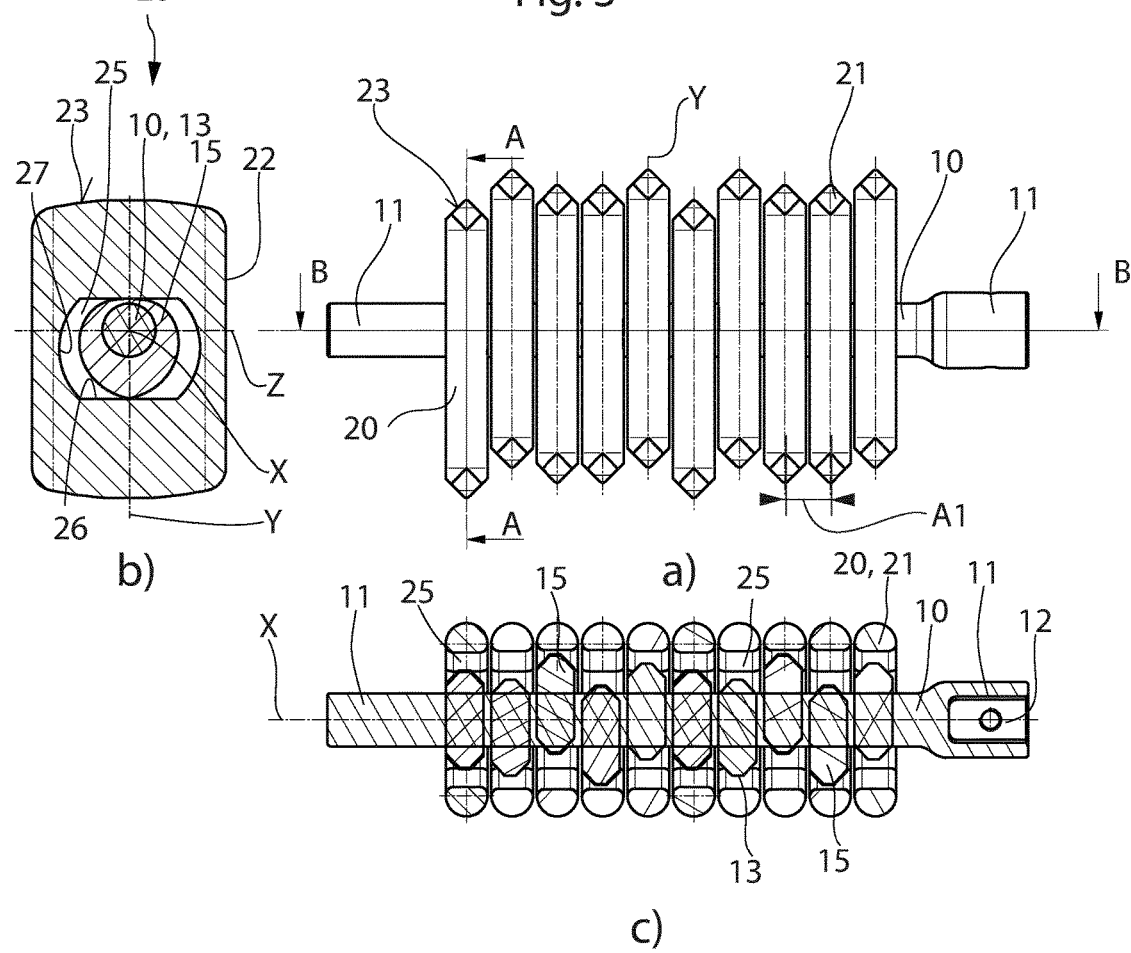

With reference to FIGS. 4b and 4c, it can be seen that each propulsion element 20 has a recess 25 which can receive a camshaft disk 15 in each case. The recess 25 completely fully pierces the propulsion element 20 in the manner of a through opening or through hole. The recess 25 is preferably formed around the center of the area in a plane transverse to the longitudinal axis X and has a maximum width B in the transverse axis Y and a height H in a vertical axis Z. In the transverse axis Y, the recess 25 is framed by two side surfaces 26 and in the vertical axis Z by two transverse surfaces 27. The height H is preferably at least as great as the width B and more preferably the height H is greater than the width B, i.e., $H \geq B$.

A propulsion tooth 21 is arranged in each case in the transverse axis Y on the side facing away from the recess 25, each propulsion tooth 21 having a height H1, a width L1, and a tooth flank angle γ1.

The drive coupling between the camshaft 10 and the propulsion element 20 takes place in the recess 25 by means of an effective contact between a friction surface 13 of the camshaft disk 15 and the side surfaces 26 of the recess 25; this is shown in particular in the sectional representations according to FIGS. 4b and 4c. By means of the coupling between the camshaft 10 and the relevant propulsion element 20, the propulsion element 20 can be pushed into and back out of the rack 30 without having to provide separate return means for this purpose. For pushing in, a force is applied to the camshaft disk 15 on one of the side surfaces 26 and, for pushing out, a force is applied to the camshaft disk 15 on the opposite side surface 26.

A row of ten propulsion elements 20 each having two propulsion teeth 21 on opposite sides is arranged around the camshaft 10 symmetrically with respect to the longitudinal axis X. The propulsion teeth 21 of adjacent propulsion elements 20 are arranged—measured in the longitudinal axis X—at a distance A1. The row is aligned in parallel with the longitudinal axis X. The guide recess 45 forms a bearing for the propulsion tooth 21 in each case, as a result of which the propulsion element 20 is mounted so as to lift easily transversely to the longitudinal axis X and can be pushed through the guide recess 45 into and out of the tooth spaces 32 of the rack 30.

In the pushed out state, each propulsion tooth 21 can be guided along the longitudinal axis X over a tooth tip of one of the teeth 31 of the rack 30.

Each propulsion tooth 21 can preferably be adapted to the shape of the teeth 31 of the rack 30, as a result of which the tooth flanks of the propulsion tooth 21 lie flat against the flanks of the teeth 31 when the propulsion tooth 21 has fully entered the tooth space 32. The width L1 of each propulsion tooth 21 may correspond to the distance A2 between two teeth 31. It may be advantageous if a distance A1 between two propulsion teeth 20 is greater or smaller than the distance A2 between two teeth 31. Thus, according to a preferred embodiment, it can be the case that A2<A1 or A1>A2. In other words, the distances A1, A2 should be different, i.e., A1≠A2. However, A1=A2 can also be the case if the offset ΔA≠0 and ΔA≠Z, that is, the offset ΔA is not an integer.

Each propulsion element 20 also comprises a foot 22. The foot 22 can have a constant cross section and corresponding surfaces along which it can slide linearly with minimal friction at the guide recess 45 during the cyclical stroke movement.

The camshaft 10 and the propulsion elements 20 are drivingly coupled to one another within the recess 25 in such a manner that each propulsion element 20 performs at least one cyclical stroke movement during one rotation of the camshaft 10.

Figure 5:
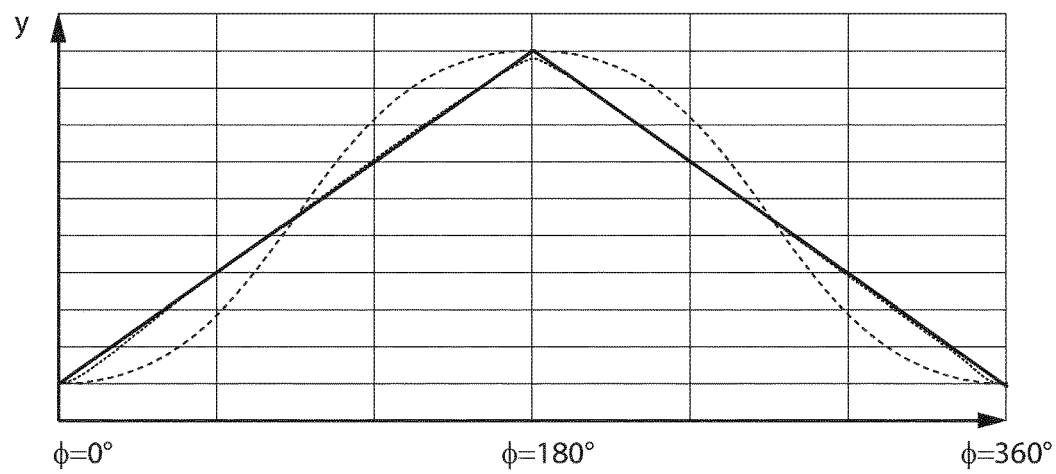
FIG. 5 shows a schematic X-Y graph in which a stroke of the propulsion element is plotted against a rotation of the camshaft.

An X-Y graph in FIG. 5 shows the stroke of a propulsion element 20 against a complete rotation (φ=360°) of the camshaft 10. According to FIG. 5, the cyclical stroke movement can be described, for example, as a complete cycle of a zigzag line or zigzag curve, each propulsion tooth 21 of the propulsion element 20 entering the rack 30 or a tooth space 32 once, fully exiting once, and returning to the initial position within one cyclical stroke movement. For comparison, a cycle of a sinusoid is shown by a dashed line in FIG. 5. The dotted line is intended to show the real (theoretical) stroke of the propulsion element 20.

By means of the camshaft disks 15, which are rotated with respect to one another at an angle α about the longitudinal axis X, the cyclical stroke movement of the respective propulsion elements 20 takes place in a phase-shifted manner, as a result of which the propulsion elements 20 are pushed into and out of, or enter and exit, the relevant rack 30 or tooth spaces 32 at different angles of rotation of the camshaft 10. The propulsion teeth 21, which are arranged on the opposite side of the propulsion elements 20, are also pushed into and out of the relevant rack 30 or tooth spaces 32 at different angles of rotation of the camshaft 10, there being a phase shift of 180° between the propulsion teeth 21 of a propulsion element 20. In other words, the propulsion teeth 21 of different propulsion elements 20 engage with a tooth space 32 at different points in time in the case of a constant rotational speed of the camshaft 10.

Each camshaft disk 15 has a friction surface 13 which forms the outer side facing the recess 25 of the propulsion element 20. The friction surface 13 and the side surfaces 26 of the recess 25 slide off one another and a force which acts radially or as a secant is applied to the relevant propulsion element 20 by means of the friction surface 13, which force pushes the propulsion element 20 toward the rack 30 and then pushes it back out in the opposite direction.

The mode of operation of the linear drive 1 is based on the fact that each propulsion element 20 comes into friction contact with a flank of one of the teeth 31 of the rack 30 when said element enters a tooth space 32 of the rack 30. When the propulsion tooth 21 enters, firstly a peak 28 of a first flank or one of the friction surfaces 23 comes into contact with the flank or the friction surface 33 of one the teeth 31 on account of a preferably crowned design of the propulsion tooth 21. Due to the wedge-shaped design, the two friction surfaces 23, 33 generate a propulsion which is directed in the longitudinal axis X and which causes the carriage 50 to slide in the space along the longitudinal axis X. As soon as one of the propulsion teeth 21 of the propulsion element 20 has fully entered the rack 30, a further propulsion tooth 21 arranged offset from the center of a further tooth space 32 follows in a phased-shifted manner. The further propulsion tooth 21 of a further propulsion element 20 enters a further tooth space 32 and generates a propulsion. In the meantime, the propulsion tooth 21 which fully entered the tooth space 32 first is pushed out of the tooth space 32 by means of the contacting friction surfaces 23, 33 and the propulsion tooth 21 arranged on the opposite side of the relevant propulsion element 20 is simultaneously pushed into an opposite tooth space 32 of the opposite rack 30. Further propulsion teeth 21 can follow in an offset or simultaneous manner, as a result of which a further propulsion can be generated.

By means of the crowned design of the propulsion tooth 21, a noise reduction can be achieved and the smooth running of the linear drive 1 can be improved.

Figure 6:
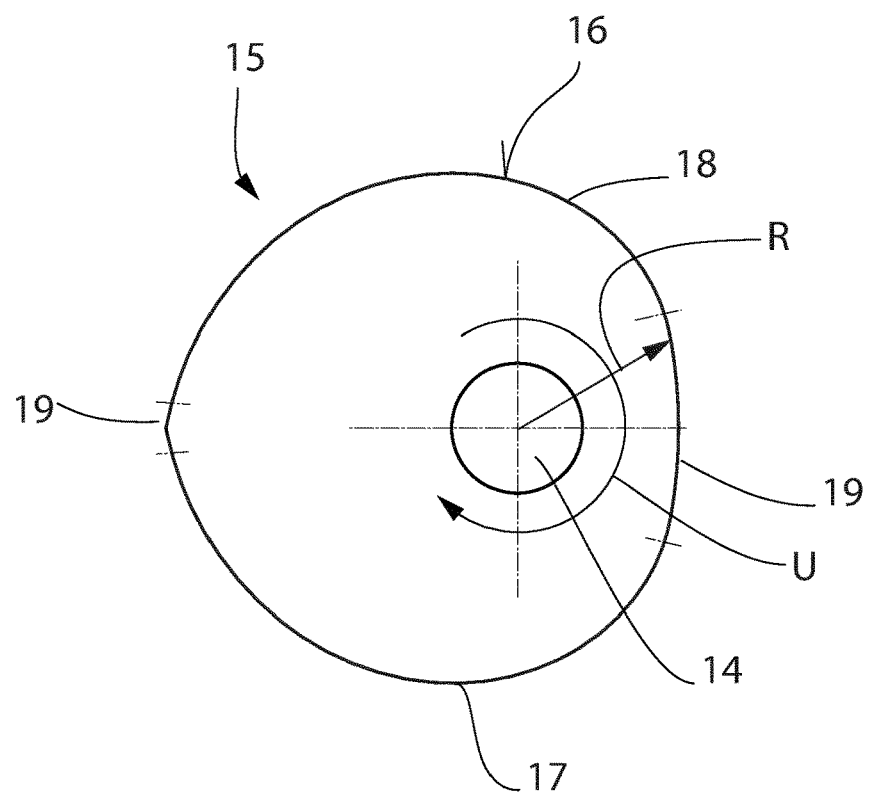
FIG. 6 shows a simplified representation of a contour of a camshaft disk.

As can be seen from the enlarged representations in FIGS. 4b and 6, the camshaft disk 15 has a particular shape by means of which a movement of the relevant propulsion element 20 can be generated that is as linear and constant as possible. More specifically, the camshaft disk 15 is heart-shaped in the illustrated exemplary embodiment and has a first portion 17 and a second portion 18, each of which extends over a semicircle. The first portion 17 and the second portion 18 are mirror-symmetrical and have approximately the profile of a spiral. The spiral-shaped profile of each portion 17, 18 is selected in such a way that the change in radius R, i.e., the distance between the longitudinal axis X and the friction surface 13, changes approximately constantly in a direction of rotation as the revolution angle φ increases, i.e., Δφ≈|ΔR|. Therefore, in the first portion 17, the radius R increases linearly, as shown in FIG. 5 on the basis of the idealized solid line. In this portion 17, Δφ≈ΔR applies approximately. In the second portion 18, the radius R decreases linearly, as shown in FIG. 5 on the basis of the idealized solid line. In this portion 18, Δφ≈ΔR applies approximately. Furthermore, the radius of the two portions 17, 18 is selected in such a way that the distance between two diametrical sides of the friction surface 16 corresponds approximately to the width B of the recess 25. As a result, when the camshaft disk 15 rotates, a center of the area of the camshaft disk travels exactly on the transverse axis Y in the transverse direction.

A transition 19 connecting the spiral-shaped profiles is formed between the first portion 17 and the second portion 18 in each case. The portions 17, 18 and the transitions 19 are separated symbolically by dash-dotted lines.

The transition 19 is formed in the manner of a transition radius and, in a preferred and illustrated design, can correspond approximately to the width B of the recess 25. In order to avoid wedging or jamming of the camshaft disk 15 in the recess 25, the transitions 19 can be selected in such a way that the distance between the two opposite diametrically formed transitions 19 is at least 90%, preferably more than 95%, of the width B of the recess 25.

Each propulsion element 20 undergoes a complete cycle during a single rotation (φ=360°). In other words, each propulsion element 20 is pushed into and out of the rack 30 in the case of one rotation (φ=360°) of the camshaft 10. Due to the angular offset between two camshaft disks 15 spaced apart in the longitudinal axis X, the phase shift Δφ based on one rotation (φ=360°) of the longitudinal axis X is 1/16φ. In other words, the camshaft 10 must be rotated by 22.5° so that, after a first propulsion element 20 is pushed in, a second propulsion element 20 enters a further tooth space 32 of the same rack 30. Each second propulsion tooth 21, arranged on the opposite side, is pushed into and out of the rack 30 arranged on the opposite side with a phase shift Δφ of 180°.

The teeth 31 of the rack 30 and the propulsion teeth 21 (not shown) may have different tooth geometries. For example, the teeth 31 can be sinusoidal or zigzag-shaped with two flanks that are symmetrical about a line of symmetry S. In addition, either the teeth 31 or the propulsion teeth 21 can be rectangular and at least the teeth 31 of the rack 30 or the propulsion teeth 21 for generating a propulsion have a friction surface 23, 33 with a tooth flank angle γ1, γ2, which surface is formed in the shape of a wedge in order to generate a propulsion.

As soon as a propulsion tooth 21 enters a tooth space 32, a form fit is brought about between the rack 30 and the carriage 50, as a result of which the carriage 50 is approximately free of play in the longitudinal axis X. The propulsion teeth 21 of the propulsion elements accordingly wedge the carriage 50 in the longitudinal axis X and the propulsion teeth 21 engaged with the rack 30 predetermine the breaking load, which can be set as desired by the number of propulsion teeth 21 in a row as well as by the number of rows.

FIGS. 6a to 6c show different size ratios of the propulsion teeth 21 and the teeth 31 of the rack 30. Each propulsion tooth 21 has a tooth length L1, a tooth depth H1, and a tooth flank angle γ1. Likewise, the teeth 31 of the rack 30 have a tooth length L2, a tooth depth H2, and a tooth flank angle γ2, where typically the tooth flank angles γ1, γ2 can be selected to be the same, so that a surface contact can be formed between the tooth flanks of the propulsion teeth 21 and the rack 30. It should be noted, however, that at least one of the tooth flanks can also have a curved shape.

FIG. 6a shows schematically an exemplary size ratio between the propulsion tooth 21 and the teeth 31 of the rack 30 according to FIGS. 1 and 2. It can be seen here that the distance A1 between the propulsion teeth 21 is greater than the distance A2 of the teeth 31 of the rack 30 and that the tooth depths H1, H2 and the tooth lengths L1, L2 are approximately the same.

An enlargement of the teeth 31 of the rack 30 in relation to the propulsion teeth 21 can be seen in FIG. 6b, it also being evident from this figure that a plurality of propulsion teeth 21 can enter a tooth space 32 between two teeth 31. By enlarging the teeth 31 of the rack 30, the contact surface of the propulsion teeth 21 on the tooth flanks 33 of the teeth 31 is increased, which means that force can be transmitted more uniformly.

In the development shown in FIG. 7b, it can be advantageous if the teeth 31 of the opposite racks are arranged in an offset manner, preferably $\Delta A = \frac{1}{2} A2$, in order to achieve an increase in the surface contact, the load capacity, and the smooth running. The opposite rack 30 is not shown for reasons of simplification.

A greater overlap between the propulsion teeth 21 and the tooth flanks 33 of the teeth 31 of the rack 30 can be achieved by increasing the tooth length L1 or by increasing the tooth depth H1, according to which: A1>A2, L1>L2, and H1>H2. By means of a greater overlap between the propulsion teeth 21 and the tooth flanks 33, a higher maximum load can be achieved and the smooth running of the linear drive 1 can be increased.

LIST OF REFERENCE NUMERALS

1 Linear drive
10 Camshaft
11 Bearing portion
12 Connecting portion
13 Drive shaft
14 Opening
15 Camshaft disk
16 Friction surface
17 First portion
18 Second portion
19 Transition
20 Propulsion element
21 Propulsion tooth
22 Foot
23 Friction surface
24 Tooth tip
25 Recess
26 Side surface
27 Transverse surfaces
28 Peak
30 Rack
31 Tooth
32 Tooth space
33 Friction surface
40 Rack housing
41 First end region
42 Second end region
45 Guide recess
46 Space
48 Bearing
50 Carriage
53 First housing part
54 Second housing part
60 Drive
65 Transmission
A1 Distance
A2 Distance
$\Delta A$ Offset
B Width
H Height of 25
H1 Tooth depth
H2 Tooth depth
L1 Tooth length
L2 Tooth length
X Longitudinal axis
Y Transverse axis
Z Vertical axis
$\alpha$ Angle
$\gamma 1$ Tooth flank angle of 21
$\gamma 2$ Tooth flank angle of 31
$\phi$ Revolution angle

The invention claimed is:

1. A linear drive (1), comprising:
   a camshaft (10) having at least one camshaft disk (15) which is arranged in a longitudinal axis (X),
   at least one rack (30) comprising at least one tooth (31), and
   at least one propulsion element (20) having at least one propulsion tooth (21),
   wherein the at least one propulsion element (20) has a recess (25) with which the camshaft (10) engages,
   wherein the camshaft (10) is coupled to the at least one propulsion element (20) by means of the at least one camshaft disk (15), and
   wherein the propulsion element (20) can be pushed into and out of the rack (30) in order to generate a propulsion in the longitudinal axis (X) when the camshaft (10) rotates.

2. The linear drive (1) according to claim 1, characterized in that the recess (25) pierces the propulsion element (20).

3. The linear drive (1) according to claim 1, characterized in that the camshaft (10) pierces the propulsion element (20) in the recess (25).

4. The linear drive (1) according to claim 1, characterized in that the camshaft (10) comprises at least two camshaft disks (15) which are arranged in parallel and spaced apart in the longitudinal axis (X).

5. The linear drive (1) according to claim 1, characterized in that the at least two camshaft disks (15) are arranged at an angular offset by an angle (a) about the longitudinal axis (X).

6. The linear drive (1) according to claim 1, characterized in that the at least one camshaft disk (15) is asymmetrical about the longitudinal axis (X).

7. The linear drive (1) according to claim 1, characterized in that a friction surface (16) of the camshaft disk (15) is formed at a distance (A) from the longitudinal axis (X) in the direction of rotation and in that the change in the distance (A) in at least one first portion (17) increases linearly in a direction of rotation and decreases linearly in the direction of rotation in at least one second portion (18).

8. The linear drive (1) according to claim 1, characterized in that the at least one first portion (17) and the at least one second portion (18) are connected by rounded transitions (19).

9. The linear drive (1) according to claim 1, characterized in that the first portion (17) extends over a first semicircle and in that the second portion (18) extends over a second semicircle.

10. The linear drive (1) according to claim 1, characterized in that a width (B) of the recess (25) is selected in such a way that the camshaft disk (15) is encompassed without play.

11. The linear drive (1) according to claim 1, characterized in that a height (H) of the recess (25) is selected in such a way that the camshaft disk (15) is contact-free.

12. The linear drive (1) according to claim 1, characterized in that at least two racks (30) are provided, and in that the at least two racks (30) are mutually offset by an offset (ΔA).

13. The linear drive (1) according to claim 1, characterized in that at least two propulsion teeth (21) and/or at least two propulsion elements (20) are provided.

14. The linear drive (1) according to claim 13, characterized in that the at least two propulsion teeth (21) are arranged in a row at a first distance (A1) in the longitudinal axis (X), and in that the teeth (31) of the rack are arranged in a row at a second distance (A2) along the longitudinal axis (X), where the following applies:

A1<A2 or A1>A2.

15. The linear drive (1) according to claim 1, characterized in that each propulsion tooth (21) has a greater, equal, or smaller tooth length (L1) and/or a greater tooth depth (H1) than the tooth (31) of the rack (30).

16. The linear drive (1) according to claim 1, characterized in that each propulsion tooth (21) and each tooth (31) have an equal tooth flank angle ($\gamma 1$, $\gamma 2$).

17. The linear drive (1) according to claim 1, characterized in that each propulsion tooth (21) is crowned.

18. The linear drive (1) according to claim 1, characterized in that a drive (60) is provided which can drive the camshaft (10).

19. The linear drive (1) according to claim 1, characterized in that the drive (60) is coupled to the camshaft (10) via a transmission (65).

20. The linear drive (1) according to claim 1, characterized in that the camshaft (10) and/or the at least one propulsion element (20) is or are arranged on a carriage (50).

21. The linear drive (1) according to claim 1, characterized in that the carriage (50) holds the at least one propulsion element (20) so as to be movably supported in a plane in the longitudinal axis (X).

22. A longitudinal adjustment unit for a seat, in particular for a vehicle seat according to claim 1.

23. A motor vehicle having a longitudinal adjustment unit according to claim 22.

* * * * *